J. J. KNIGHT AND M. LEE.
BEARING AND METHOD OF CONSTRUCTING THE SAME.
APPLICATION FILED JULY 22, 1919.
1,354,200.
Patented Sept. 28, 1920.
2 SHEETS—SHEET 2.
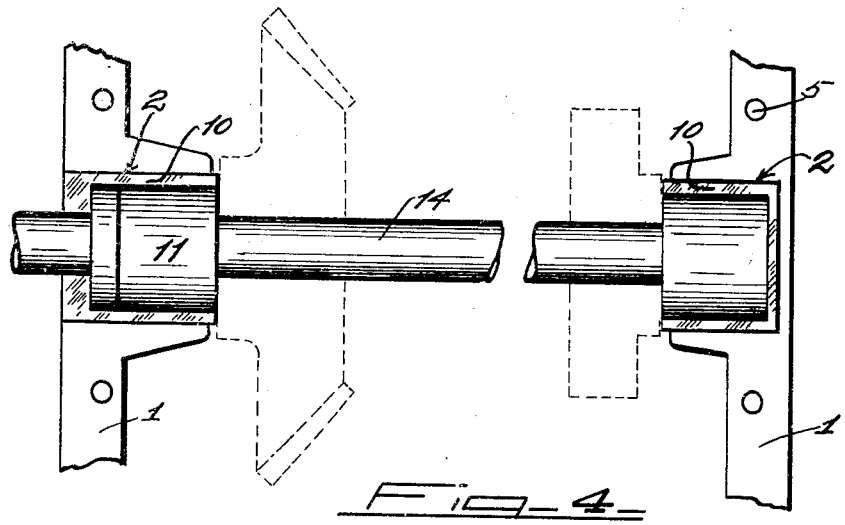
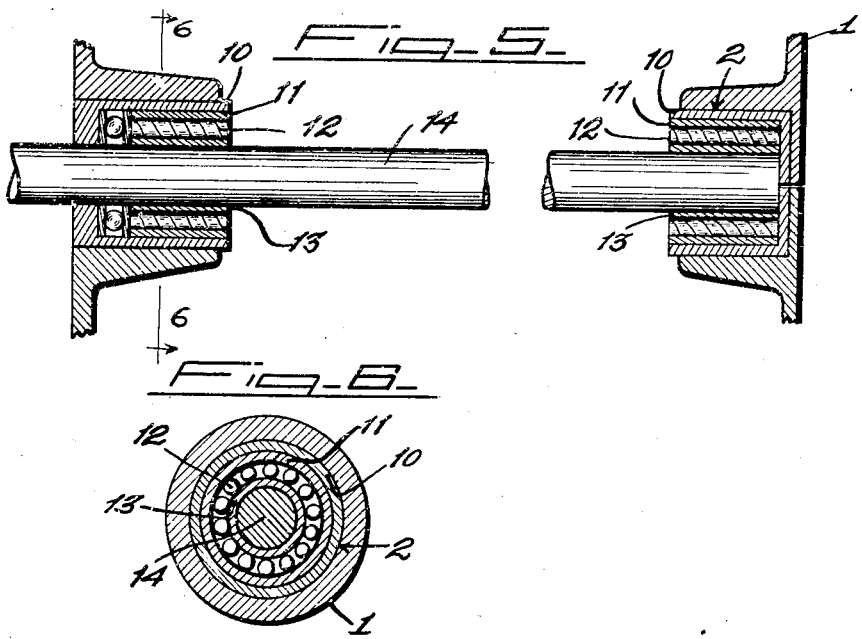
WITNESS
INVENTORS
John J. Knight,
Mark Lee,
BY Ackren + Totten
ATTORNEYS

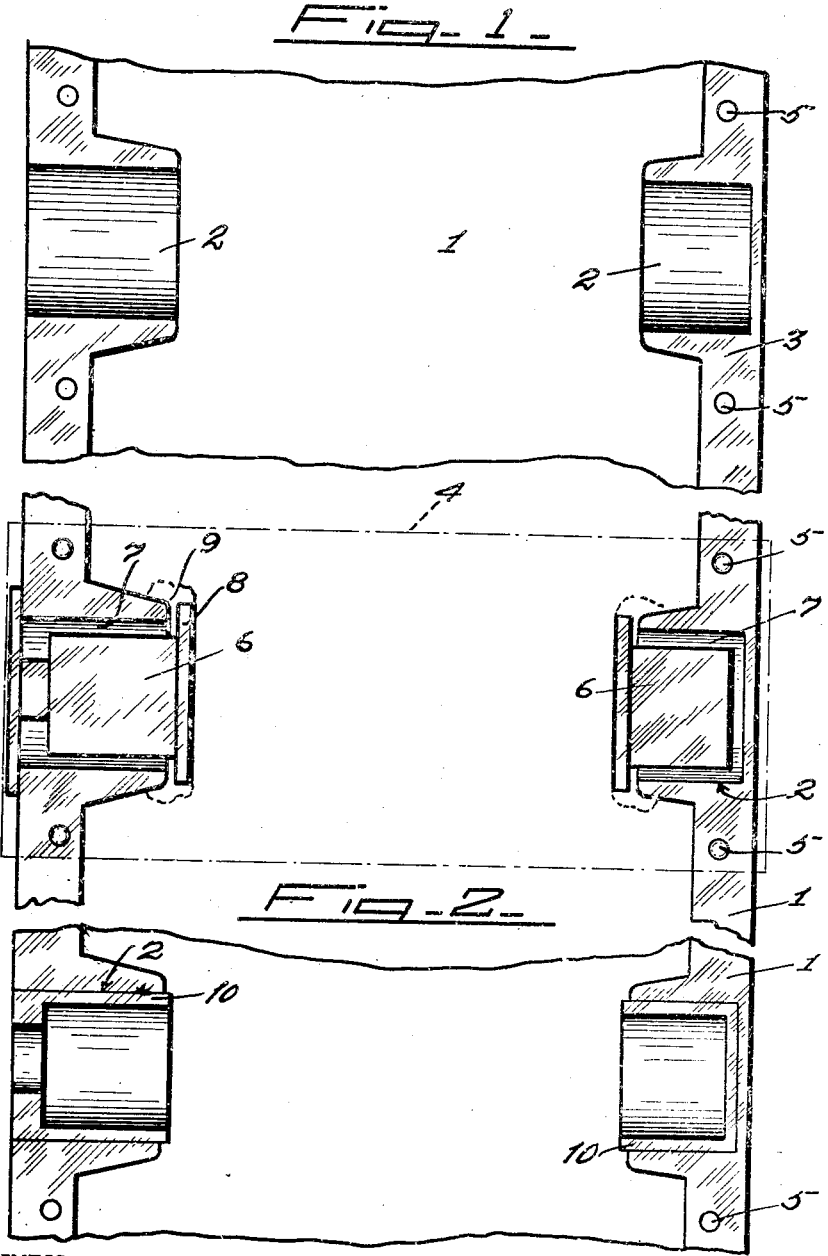

UNITED STATES PATENT OFFICE.

JOHN JAMES KNIGHT, OF ALAMEDA, AND MARK LEE, OF OAKLAND, CALIFORNIA.

BEARING AND METHOD OF CONSTRUCTING THE SAME.

1,354,200.     Specification of Letters Patent.     Patented Sept. 28, 1920.

Application filed July 22, 1919. Serial No. 312,616.

*To all whom it may concern:*

Be it known that we, JOHN J. KNIGHT and MARK LEE, citizens of the United States, residing the said KNIGHT at Alameda, in the county of Alameda and State of California, and the said LEE at Oakland, county of Alameda, State of California, have invented certain new and useful Improvements in Bearings and Methods of Constructing the Same, of which the following is a specification.

The present invention relates to improvements in bearings and to the method of making the same, and the invention has for its principal object to provide a bearing construction which is capable of being quickly and cheaply manufactured; one which does not require scraping and wherein the same is capable of being formed in a rough casting recess in a suitable metallic body.

At present it is the practice, when forming certain types of bearings, to machine the bearing seat in the supporting body and then to fit therein a previously cast bearing, and thence to scrape the same to provide the proper bearing surface for the shaft to be received therein, which method is very expensive owing to the time and labor required, and which materially increases the cost of articles having a number of bearings of this type.

By the present method the bearing seats are preferably roughly cast in the supporting material and a mandrel of the required size and shape is held in position therein and the bearing supporting material or base, preferably of Babbitt metal, is poured into the seat, which, when the mandrel is removed, provides a smooth surface for receiving the shaft supporting bearing, and which does not require scraping to properly seat the bearing therein.

To more fully comprehend the invention, reference is directed to the accompanying drawings, wherein—

Figure 1 illustrates a body having bearing seats cast therein.

Fig. 2 discloses another step of the method wherein a mandrel is properly positioned within the seat and about which the babbitt is poured.

Fig. 3 is a view of the poured bearing.

Fig. 4 is a view illustrating an anti-friction bearing received in the poured babbitt.

Fig. 5 is a vertical sectional view taken on line 5—5 of Fig. 4.

Fig. 6 is a sectional view taken on line 6—6 of Fig. 5.

Referring particularly to Figs. 1 to 3 inclusive of the drawings, the present method is preferably carried out as follows:

In the body 1 of any suitable material, such as a crank casing, frame or the like, is preferably formed during the formation of said frame by being cast therein, the bearing seats 2, which are somewhat larger than the bearing and shaft to be received therein.

Positioned on the upper planed surface 3 is a suitable mandrel or core mounting plate 4 held in position in any suitable manner as by bolts 5, which pass through openings in the surface 3, and said plate carries on its underside suitable mandrels or core members 6 of the size and configuration of the bearing to be received in the seats 2, said mandrels being smaller than the seats 2, affording a space 7 between the surface of the seat and the surface of the mandrel or core. The mandrel 6, illustrated at the left hand side of Fig. 2 of the drawings, is of such type as to permit of the mounting of a shaft to extend laterally beyond the edge of the member 1, while the mandrel 6 at the right hand side of Fig. 2 is adapted for use in forming what may be termed a blind or closed end bearing. With the mandrels positioned as in Fig. 2 of the drawings, and with the spaces between the end walls of the seats 2 and the mandrel flanges 8 closed by suitable packing material 9, the hot lining material, such as Babbitt metal, is poured into the space 7 completely filling the space between the mandrel surface and the surface of the seats 2, and which, when cooled and the mandrels are removed, provides a lining or seat 10, Fig. 3 of the drawings, in which rests the outer shell 11, Figs. 4, 5 and 6 of the drawings, of a suitable anti-friction roller or ball type of bearing 12, the inner sleeve 13 of which is tubular in form and is adapted to receive the rotating shaft 14.

By pouring the lining 10 in the seat 2 and making the same of a predetermined thickness to snugly receive the shell 11, said shell is capable of positioning therein without the required scraping necessary when a poured bearing or babbitt seat is positioned directly in the seat 2 and in which is directly received the shaft to be rotated, and which is required to be scraped to provide the proper seating of the shaft therein.

It will be apparent that by constructing a bearing by the present method that a number of linings are capable of being poured at the same time and an anti-friction bearing is adapted for reception within each without further machining, scraping or working of the lining.

By employing the mandrel or core illustrated at the left in Fig. 2 of the drawings, we are enabled to provide a bearing seat or lining through which a shaft may extend or project and snugly contact with the Babbitt metal forming the end of the lining and obtain a structure which is substantially lubricant tight around the shaft without the necessity of employing threaded collars which are now universally in use.

Having thus described our invention, what we claim as new and desire to protect by Letters Patent is:—

1. The method of making a bearing consisting first in casting a bearing seat within a supporting body, thence positioning therein a mandrel or core of the size of the bearing to be mounted and smaller than said bearing seat to provide a space between the surface of the mandrel or core and the surface of the seat, thence pouring the fluid metal into said space to line said seat and permitting the same to harden, and thence removing the mandrel or core and positioning an anti-friction bearing within the lined seat with the outer shell thereof resting on the surface of the liner.

2. The method of making a bearing consisting in first casting a bearing seat within the supporting body of a size greater than the shaft to be accommodated, thence positioning within said casting seat a mandrel or core of a size and configuration of the bearing to be received, thence babbitting the intervening space between the mandrel or core and the bearing seat wall, thence removing the mandrel or core and positioning within said lined seat an anti-friction bearing with the outer shell thereof snugly fitting the surface of said liners.

3. A bearing consisting of a seat, a metallic lining cast therein and of a conformation to snugly receive the anti-friction bearing to be seated therein without scraping, a double shell anti-friction bearing resting on said lining with its outer shell in tight frictional contact with said lining, and a shaft extending through the inner shell of said bearing.

4. The method of making a bearing, consisting in first casting an open ended bearing seat within a supporting body, thence positioning therein a core a portion of which is of the size of the bearing to be mounted and a portion projecting to the outer open end of the bearing seat being of a size corresponding to that of the shaft to extend beyond said support and a portion of said core closing the outer open end of said seat, thence babbitting the intervening space between the core and bearing seat and outer end wall, thence removing the core and positioning within said bearing seat a double sleeve roller type bearing with the outer shell thereof snugly fitting the surface of the liner and with the inner sleeve in alinement with the contracted outer end of said lined seat.

5. A bearing for a shaft having a projecting end, comprising a cast seat, a metallic lining cast therein and providing a bearing receiving chamber having a contracted opening at one end of a diameter less than said bearing receiving chamber and corresponding to that of the shaft to extend therethrough, a double sleeve anti-friction bearing resting in said chamber with its outer shell in tight frictional contact with said lining, and a shaft extending through the inner sleeve of the bearing and through said contracted opening.

In testimony whereof we have signed our names to this specification in the presence of a subscribing witness.

JOHN JAMES KNIGHT.
MARK LEE.

Witness:
HARRY A. TOTTEN.